May 8, 1923.
H. R. C. VAN DE VELDE ET AL
1,454,592
WIRELESS DIRECTION FINDING MEANS FOR AND METHOD OF PILOTING AIRCRAFT
Filed Jan. 7, 1921
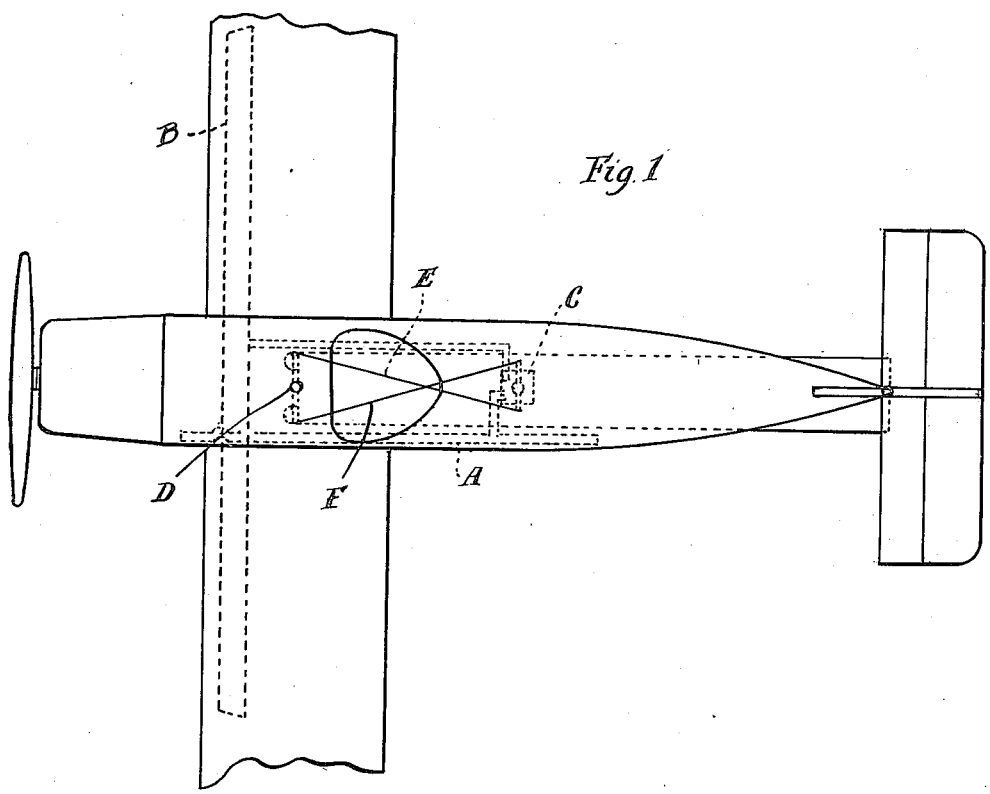
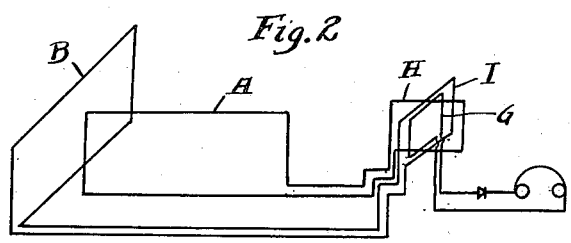
Inventors
H. R. C. Van De Velde
and J. M. Furnival
By Attorney
Ira J. Adams Patented May 8, 1923.

1,454,592

UNITED STATES PATENT OFFICE.

HAROLD ROBERT CORBY VAN DE VELDE AND JOHN MEGARRY FURNIVAL, OF BROMLEY, ENGLAND, ASSIGNORS TO RADIO CORPORATION OF AMERICA, OF NEW YORK, N. Y., A CORPORATION OF DELAWARE.

WIRELESS DIRECTION-FINDING MEANS FOR AND METHOD OF PILOTING AIRCRAFT.

Application filed January 7, 1921. Serial No. 435,718.

*To all whom it may concern:*

Be it known that we, HAROLD ROBERT CORBY VAN DE VELDE and JOHN MEGARRY FURNIVAL, British subjects, both of 57 Ravensbourne Road, Bromley, Kent, England, have invented new and useful Improvements in Wireless Direction-Finding Means for and Methods of Piloting Aircraft, of which the following is a specification, accompanied by drawings.

The object of this invention is to provide improved wireless direction finding means whereby the pilot of any type of aircraft can automatically find his way.

According to this invention we connect the moving part of any ordinary direction finding means in which the maximum or minimum method is employed either to the rudder bar controlling the direction of flight of the aircraft or to any auxiliary attachment thereto.

One method of applying the system is shown in the accompanying drawing which illustrates the standard Bellini-Tosi system.

In the drawing:

Fig. 1 is a plan view of an aeroplane having a direction finder in accordance with the invention.

Fig. 2 is a diagrammatic view showing the angular relation of the coils of Fig. 1.

Two loops of wire A, B, are employed located in planes substantially at right angles. One of the loops B is suspended around the upper and lower wings of the aeroplane perpendicular with the line of flight. The other coil A is parallel to the line of flight and wound around the fuselage. Each of the coils are both normally substantially in a vertical plane.

The wing coil B and the fuselage coil A are connected to a radiogoniometer or direction finder C; the search coil G of which is connected by means of control wires E and F to the opposite sides of the rudder bar D in such a manner that when the rudder is moved in a clockwise direction the search coil is rotated in a counter-clockwise direction. The coil H of the radiogoniometer is connected to loop A and coil I is connected to loop B. The search coil G is normally in the plane of the radiogoniometer coil 1.

According to the above scheme it will be seen that if the pilot is flying in a direct line to a wireless beacon station located on an aerodrome which he desires to find, no signals will be heard while he is on his course, because currents will be induced in loop A and coil H but no currents will be induced in loop B and coil I. As the search coil G is perpendicular to coil H no currents will be induced therein. If the pilot is blown to the right or to the left a signal will be received from the station that is transmitting. This is due to the fact that currents will be induced in both loops and connected coils. The resultant field due to the coils is no longer parallel to the search coil G and currents will be induced therein due to signals. The pilot will then move his rudder bar and the search coil connected thereto in order to obtain a new minimum and the act of obtaining this minimum will automatically set a new course for his machine which is the correct one for the station to which he is flying.

If, when the pilot commences to use this method of direction finding, he is already flying on a wrong course, signals will be heard. Any move in the wrong direction will then cause an increase in the strength of the signals heard and a move in the right direction a falling off in strength.

This applies equally when flying through clouds or fog, and should materially assist in preventing "spins" and in steering a straight course where the pilot has no horizon to guide him.

If the maximum method is employed the pilot will employ similar methods except that he will fly on the loudest signal and any falling off in strength will indicate that he is moving off his course.

In this case the moving coil must be mounted with its plane normally parallel to the line of flight.

In practice the ordinary trailing aerial may be so connected to a change-over switch that it can be permanently connected for transmission while either the trailing aerial or the moving coil can be used for reception.

Having now particularly described and ascertained the nature of our said invention and in what manner the same is to be performed, we declare that what we claim is:—

1. In a wireless direction finder for flying machines having means for controlling the flight of the machines, a movable controlling element for the direction finder and operating connections between said element and the flight controlling means, substantially as described.

2. The combination with an aircraft, of a pair of loop aerials disposed at right angles to each other, a radiogoniometer associated therewith having a search coil connected to the rudder of the aircraft and a detector associated with the movable coil.

3. The combination with an aircraft, of a loop aerial around the wings perpendicular to the fuselage, a second loop aerial parallel to the fuselage, a radiogoniometer associated with said aerials having a movable coil connected to the rudder of the aircraft and a detector associated with the search coil.

4. The combination with an aircraft, of a loop aerial around the wings in a plane perpendicular to the fuselage, a second loop aerial in a plane perpendicular to the first aerial, a direction finder having two stationary coils connected to the loops, a search coil connected to the rudder of the aircraft and a detector associated with the search coil.

5. The combination with an aircraft, of a loop aerial around the wings in a plane perpendicular to the fuselage, a second loop aerial in a plane perpendicular to the first aerial, a direction finder having two relatively fixed coils connected to the loops and parallel therewith, a search coil, a detector associated with the search coil and means for rotating said search coil with the rudder of the aircraft.

6. In an aircraft having wireless direction finding means, the method of piloting the aircraft which consists in simultaneously adjusting the search coil of the direction finder and the rudder of the aircraft in accordance with the strength of the signal effects impressed on the search coil.

In testimony whereof we hereunto affix our signatures at the place and date aforesaid.

HAROLD ROBERT CORBY VAN de VELDE.
JOHN MEGARRY FURNIVAL.